May 26, 1959

E. J. BEACH 2,887,912

BORING DEVICE FOR ELLIPTICAL OR THE LIKE OPENINGS

Filed May 6, 1958

INVENTOR.
EDWARD J. BEACH
BY

*ATTORNEY*

May 26, 1959     E. J. BEACH     2,887,912
BORING DEVICE FOR ELLIPTICAL OR THE LIKE OPENINGS
Filed May 6, 1958     2 Sheets-Sheet 2

INVENTOR.
EDWARD J. BEACH
BY
ATTORNEY

United States Patent Office 2,887,912
Patented May 26, 1959

2,887,912

BORING DEVICE FOR ELLIPTICAL OR THE LIKE OPENINGS

Edward J. Beach, Brooklyn, N.Y., assignor to Beach-Russ Company, New York, N.Y., a corporation of New York Application May 6, 1958, Serial No. 733,353

12 Claims. (Cl. 77—61)

This invention relates generally to boring devices, and more particularly has reference to a device of this nature designed specifically for the boring of elliptically shaped openings.

The present invention comprises an improvement in a type of device such as generally shown in my Patent No. 2,751,800.

One important object of the present invention is to provide a device for boring elliptical openings, which device will be designed for manufacture with a relatively simplified manufacturing design, thereby to permit the device to accomplish the desired results at a comparatively low outlay so far as the initial cost of the machinery is concerned.

Another object is to provide a boring device of the character stated which will be so designed as to be swiftly adjustable to different positions relative to a work piece, to produce elliptical openings differing from one another in respect to the ratio of the major to the minor axis of the opening. In other words, it is proposed, by means of a swift and easy adjustment of the device relative to the work, to effect the boring of the opening with a minor axis or minimum diameter, which will be of a selected value in relation to the major axis or maximum diameter.

Another object is to provide a boring device of the type stated wherein the boring tool will in actuality traverse, at its tip, a circular path in a plane perpendicular to the axis of rotation of the shaft carrying said tool, with the boring of the elliptical opening in the work resulting from the fact that the axis of rotation extends obliquely to the axis of the work piece, thus to provide an elliptical opening when the work piece is fed past the boring tool.

Another object is to provide a boring device of the type described which will eliminate the need for slides and similar devices carrying the bit. The construction according to the present invention differs from that of my previous patent, in respect to the elimination of such sliding means. The present tool carries the work-engaging element in an arrangement wherein said element, its holder, and the shaft carrying the holder are all, in effect, a rigid assembly, and do not have movement relative to each other during the actual performance of the boring operation. In other words, according to the present invention, the rotating shaft of the boring device has at one end a head rigid with the remaining portion of the shaft, which head in turn is rigid with a holder, said holder receiving a boring tool which is fixedly engaged in the holder during the actual boring of the elliptical opening.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
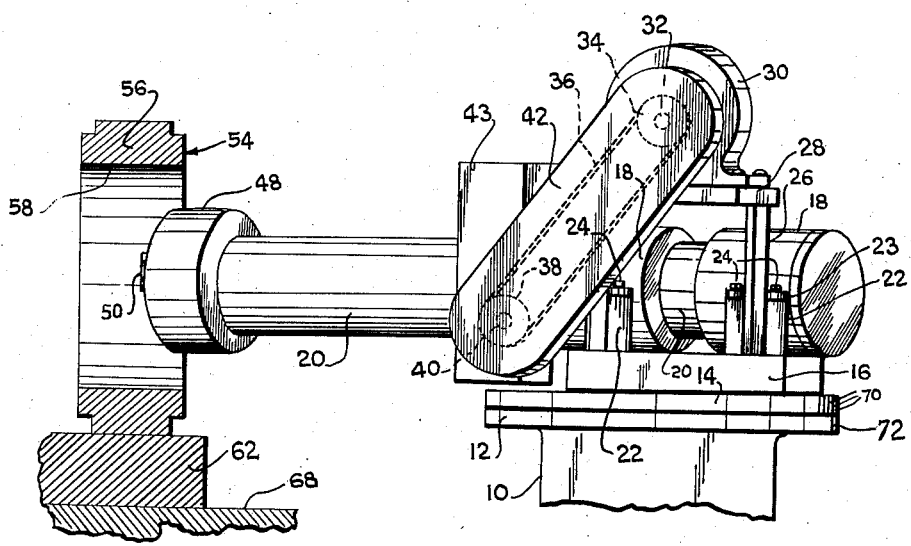
Fig. 1 is a side elevational view of a boring device according to the present invention, a work piece being shown in section, a table on which the work piece is supported also being shown in vertical section.

Referring to the drawings in detail, the boring device comprising the present invention can be used on lathes, horizontal or vertical boring machines, etc. The device is adapted to bore an elliptical opening, and in this connection, the device in effect reshapes a previously bored circular opening so that it makes the opening elliptical or "out of round."

The operational characteristics of the device are such that movable slides, and similar devices such as shown for example in my previous Patent No. 2,751,800, are eliminated. The entire boring operation is produced by an arrangement wherein the bar carrying the cutting tool has a simple rotational movement and does not carry a slide and similar means.

In any event, in the illustrated example the device is shown mounted upon a pedestal or stand 10 which is wholly stationary and which has a circular, flat top plate 12 on which is rotatably supported a circular base plate 14 of the invention. In other words, the base plate 14 comprises a turntable, and fixedly mounted upon the base plate 14 is a support block 16.

Supported upon the support block are coaxial, large-diameter, bearing cylinders 18, in which is journaled a large-diameter shaft or boring bar 20. The bearing cylinders 18 are secured fixedly to the block 16 through the provision of laterally outwardly projecting ears 23 of said cylinders. Through the ears extend hold-down bolts 24 threadedly engaged in vertically elongated, axially threadedly bored projections 22 of block 16. The rear cylinder 18 is disposed between two pairs of projections 22, while the front cylinder 18 has merely a single projection 22 at each side thereof.

At opposite sides of the cylinders 18, there are provided upstanding standards or posts 26 disposed at the four corners of a rectangular, horizontal motor support plate 28 that is spaced upwardly from the cylinders 18. An electric motor 30 is bolted to the plate 28, and secured to the shaft 32 of the motor 30 is a drive pulley 34, about which is trained a drive belt 36 extending forwardly downwardly from the motor at one side of the plate 28.

Belt 36 is trained about a driven pulley 38 secured to a shaft 40.

At this point, it may be noted that the shaft 32 of the motor extends normally to the axis of the cylinders 18 and of the boring bar 20. This be may particularly noted from Fig. 2. Similarly, driven shaft 40 extends normally to bar 20, and in front of the forward one of the cylinders 18, shaft 40 being journaled in a transversely vertically disposed bearing block 43, in which is rotatably supported a worm gear 44 connected to the shaft 40 for rotation therewith.

Worm gear 44 is in mesh with a gear 46 which is concentric with and extends about the boring bar 20, being connected to the boring bar for rotation therewith. As a result, on operation of the motor 30, the boring bar 20 is driven at a selected, reduced speed by reason of the reduction gearing comprising the worm gear 44 and gear 46.

Bar 20 projects forwardly a substantial distance beyond the turntable 14, and at its forward end is rigid with a head or enlargement 48 on the front surface of which there is secured a tool support block 50 in which is removably engaged a boring tool 52 disposed in position extending radially outwardly of the boring bar 20, said boring tool rotating in a plane perpendicular to the length or axis of the boring tool. The tool 52 is slidably mounted in a passage 53 extending through the block 50 for adjustment and is held in adjusted position by a set-screw 55.

Generally designated at 54 is a work piece, which of course would vary according to the particular type of work that is being machined. In the illustrated example, the work piece is a pump cylinder, that is to be provided with an elliptically shaped opening, as will be the case, for example, with respect to a high vacuum pump. Such a pump cylinder has a bore that is "out of round" or of elliptical cross section.

In accordance with the present invention, the work piece 54 comprises (see Figs. 1 and 2) an annular member 56 having a bore 58 and having a base 60 which may be fixedly engaged with a movable support plate 62. For example, in the illustrated example, hold-down clamps 64 are secured to the plate 62 by bolts 66, and engage the opposite sides of the base 60.

Figure 2:
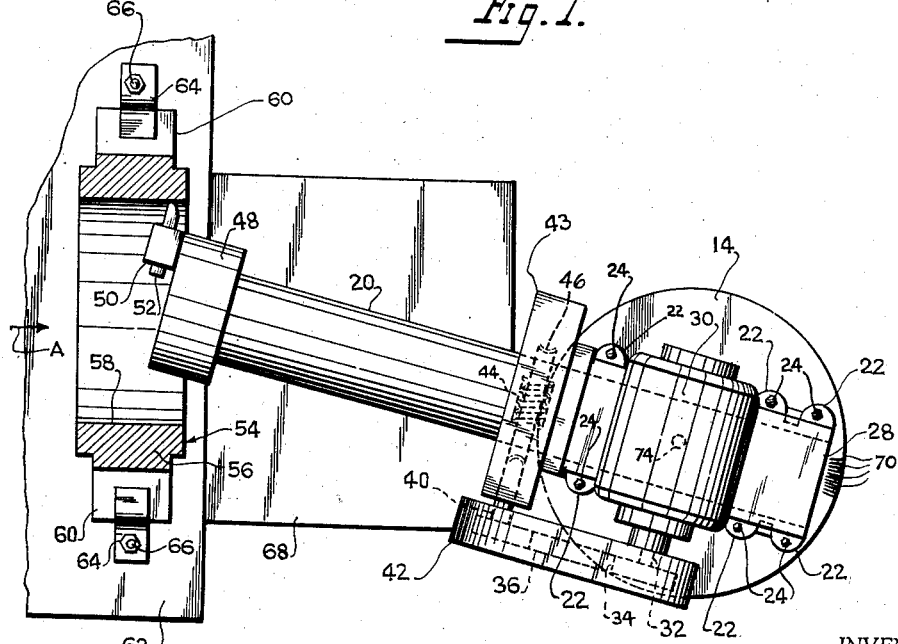
Fig. 2 is a top plan view of the device with the work piece being shown in horizontal section.

The plate 62 is mounted for sliding movement on a table 68 in a path designated by the arrow A shown in Fig. 2, that is, a straight path which is extended axially of the cylinder 54, and that is oblique to the length of the boring bar 20.

Of course, the table 68 on which the plate 62 slides would have suitable ways or a trackway, etc., this being a conventional construction that does not comprise, per se, part of the present invention.

In an event, in the arrangement shown, the rotatable plate 14 is provided with a plurality of radial, closely spaced, index markings 70 (see Fig. 2) any of which may be brought into alignment with a single line marking 72 (see Fig. 1) of the stationary plate 12.

As a result, on rotatable adjustment of the turntable 14 upon a pin or support spindle 74 (Fig. 2) centrally disposed in respect to the rotatable plate 14, the axis or longitudinal median line of the boring bar 20 will be disposed at a selected angle in respect to the axis or center line of the work piece.

Previously, the work piece would be provided with a bore 58 that would be perfectly circular, so as to reduce the amount of work required in providing the elliptical opening in the work piece.

Figure 4:
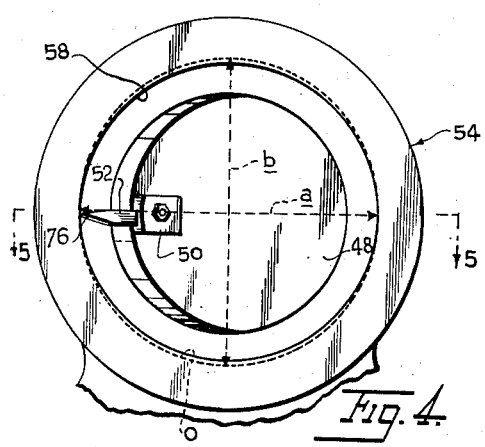
Fig. 4 is a fragmentary view somewhat similar to Fig. 3 illustrating diagrammatically the operational characteristics of the device.
Figure 5:
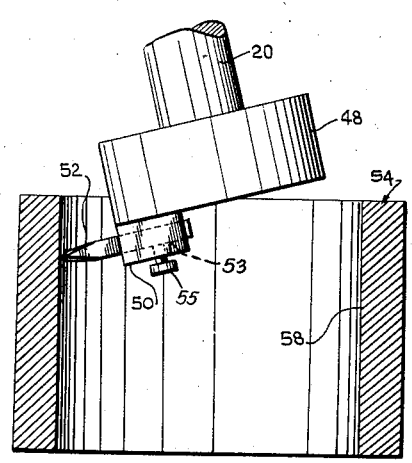
Fig. 5 is a sectional view substantially on line 5—5 of Fig. 4.
Figure 3:
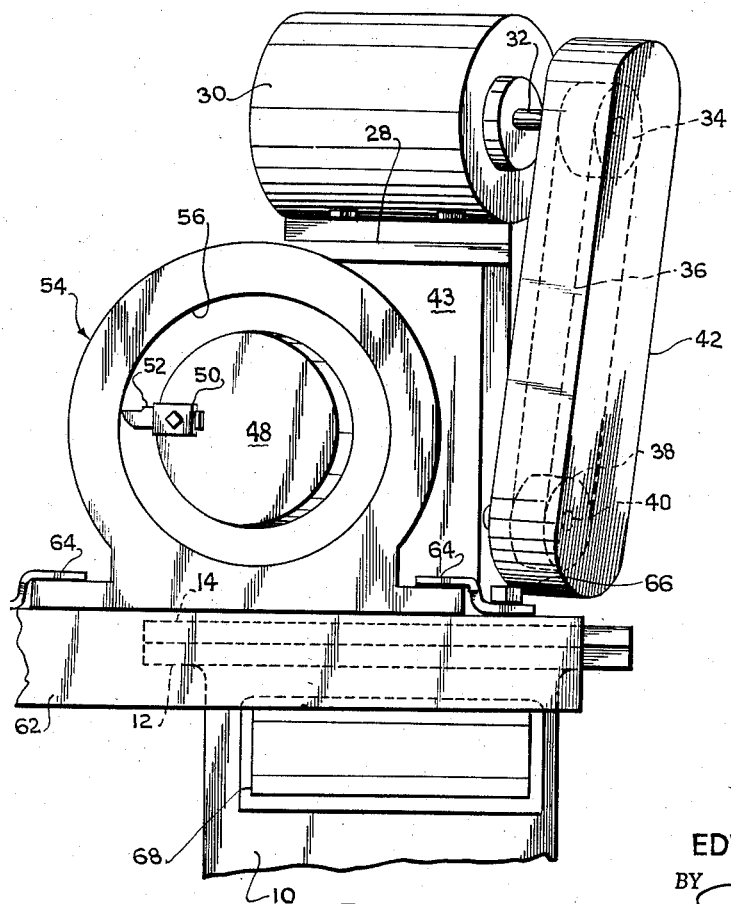
Fig. 3 is a front elevational view of the work piece and boring device.

Reference should now be had to Figs. 4 and 5. As will be noted, the circular opening has been designated at 58. This opening would be initially bored to a diameter which would be the minimum diameter of the elliptical opening. In other words, the initial diameter of the circular opening 58 would be selected so as to be exactly equal, or even slightly smaller than, the minor axis of the elliptical opening that is to be formed, said minor axis being designated in Fig. 4 at $a$.

Then, the device would be adjusted by registering a selected index marking 70 with the index 72. The smaller the angle defined by the axis of the circular work piece opening and the axis of bar 20, the less would be the difference between the length of minor axis $a$ and the length of major axis $b$ of the elliptical opening O, that is to be formed in the work piece 54.

Of course, the cutting tip of the boring tool 52 actually describes a circular path, which path lies wholly in a plane perpendicular to the axis of rotation of the boring bar 20. However, by disposing the axis of the opening 58, obliquely to the axis of the opening 58, the path described by the tip of the boring tool 52 will be elliptical, if one looks at the device along the line A shown in Fig. 2, that is, along a path which is truly axial of the work piece 54. The diameter of the circular path which is described by the tip 76 of the boring tool 52 will be equal to the length of the major axis $b$ of the elliptical opening O.

When the boring tool enters the opening 58, accordingly, it will bore an elliptical opening, it being understood that the plate 62, and hence the work piece 54, would be moved bodily along the path A to the right in Fig. 2, so that the work piece is fed past the rotating head of the boring device.

In this way, a truly elliptical opening is bored, producing an elliptical opening or "out of round" bore in the work piece, which bore will have a major axis and a minor axis that can be selected by selection of the diameter of the circular path traced by the boring tool in its plane perpendicular to the axis of the bar 20, and which will further be selected by suitable rotatable adjustment of the turntable 14 upon the stationary support plate 72.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new and desire to secure by United States Letters Patent is:

1. A device for boring elliptical openings comprising a stationary stand, a support rotatably mounted thereon for adjustment about a first axis, a shaft journaled on said support for rotation about a second axis perpendicularly intersecting the first axis, a boring tool holder having a rigid connection to said shaft, a boring tool including a tip radially spaced from the second axis to travel in a circular path about the second axis in a plane perpendicular to the second axis, and a work piece support means mounted for adjustment in a straight path obliquely intersecting the second axis whereby a work piece may be moved along said path past the boring tool, thus to cause the tool to bore an elliptical opening in the work piece, said first-named support including a turntable.

2. A device for boring elliptical openings comprising a stationary stand, a support rotatably mounted thereon for adjustment about a first axis, a shaft journaled on said support for rotation about a second axis perpendicularly intersecting the first axis, a boring tool holder having a rigid connection to said shaft, a boring tool including a tip radially spaced from the second axis to travel in a circular path about the second axis in a plane perpendicular to the second axis, and a work piece support means mounted for adjustment in a straight path obliquely intersecting the second axis whereby a work piece may be moved along said path past the boring tool, thus to cause the tool to bore an elliptical opening in the work piece, said first-named support including a turntable, in the form of a flat plate having a circular configuration.

3. A device for boring elliptical openings comprising a stationary stand, a support rotatably mounted thereon for adjustment about a first axis, a shaft journaled on said support for rotation about a second axis perpendicularly intersecting the first axis, a boring tool holder having a rigid connection to said shaft, a boring tool including a tip radially spaced from the second axis to travel in a circular path about the second axis in a plane perpendicular to the second axis, and a work piece support means mounted for adjustment in a straight path obliquely intersecting the second axis whereby a work piece may be moved along said path past the boring tool, thus to cause the tool to bore an elliptical opening in the work piece, said first-named support including a turntable, in the form of a flat plate having a circular configuration, said stand including a flat, circular top plate, the turntable overlying the top plate.

4. A device for boring elliptical openings comprising a stationary stand, a support rotatably mounted thereon for adjustment about a first axis, a shaft journaled on said support for rotation about a second axis perpendicularly intersecting the first axis, a boring tool holder having a rigid connection to said shaft, a boring tool including a tip radially spaced from the second axis to travel in a circular path about the second axis in a plane perpendicular to the second axis, and a work piece support means mounted for adjustment in a straight path obliquely intersecting the second axis whereby a work piece may be moved along said path past the boring tool, thus to cause the tool to bore an elliptical opening in the work piece, said first-named support including a turntable, in the form of a flat plate having a circular configuration, said stand including a flat, circular top plate, the turntable overlying the top plate, the turntable and top plate having cooperating index markings, for registration of selected markings in correspondingly selected positions of adjustment of the turntable relative to the top plate.

5. A device for boring elliptical openings comprising a stationary stand, a support rotatably mounted thereon for adjustment about a first axis, a shaft journaled on said support for rotation about a second axis perpendicularly intersecting the first axis, a boring tool holder having a rigid connection to said shaft, a boring tool including a tip radially spaced from the second axis to travel in a circular path about the second axis in a plane perpendicular to the second axis, and a work piece support means mounted for adjustment in a straight path obliquely intersecting the second axis whereby a work piece may be moved along said path past the boring tool, thus to cause the tool to bore an elliptical opening in the work piece, said first-named support including a turntable, in the form of a flat plate having a circular configuration, said stand including a flat, circular top plate, the turntable overlying the top plate, the turntable and top plate having cooperating index markings, for registration of selected markings in correspondingly selected positions of adjustment of the turntable relative to the top plate, said support including bearings providing the journal for said shaft.

6. A device for boring elliptical openings comprising a stationary stand, a support rotatably mounted thereon for adjustment about a first axis, a shaft journaled on said support for rotation about a second axis perpendiculary intersecting the first axis, a boring tool holder having a rigid connection to said shaft, a boring tool including a tip radially spaced from the second axis to travel in a circular path about the second axis in a plane perpendicular to the second axis, and a work piece support means mounted for adjustment in a straight path obliquely intersecting the second axis whereby a work piece may be moved along said path past the boring tool, thus to cause the tool to bore an elliptical opening in the work piece, said first-named support including a turntable, in the form of a flat plate having a circular configuration, said stand including a flat, circular top plate, the turntable overlying the top plate, the turntable and top plate having cooperating index markings, for registration of selected markings in correspondingly selected positions of adjustment of the turntable relative to the top plate, said support including bearings providing the journal for said shaft, said support further including a frame through which the bearings extend, the boring device including a motor mounted upon the frame above the bearings, the motor having a driving connection with said shaft.

7. A device for boring elliptical openings comprising a stationary stand, a support rotatably mounted thereon for adjustment about a first axis, a shaft journaled on said support for rotation about a second axis perpendicularly intersecting the first axis, a boring tool holder having a rigid connection to said shaft, a boring tool including a tip radially spaced from the second axis to travel in a circular path about the second axis in a plane perpendicular to the second axis, and a work piece support means mounted for adjustment in a straight path obliquely intersecting the second axis whereby a work piece may be moved along said path past the boring tool, thus to cause the tool to bore an elliptical opening in the work piece, said first-named support including a turntable, in the form of a flat plate having a circular configuration, said stand including a flat, circular top plate, the turntable overlying the top plate, the turntable and top plate having cooperating index markings, for registration of selected markings in correspondingly selected positions of adjustment of the turntable relative to the top plate, said support including bearings providing the journal for said shaft, said support further including a frame through which the bearings extend, the boring device including a motor mounted upon the frame above the bearings, the motor having a driving connection with said shaft, said driving connection being of the change speed type.

8. A device for boring elliptical openings comprising a stationary stand, a support rotatably mounted thereon for adjustment about a first axis, a shaft journaled on said support for rotation about a second axis perpendicularly intersecting the first axis, a boring tool holder having a rigid connection to said shaft, a boring tool including a tip radially spaced from the second axis to travel in a circular path about the second axis in a plane perpendicular to the second axis, and a work piece support means mounted for adjustment in straight path obliquely intersecting the second axis whereby a work piece may be moved along said path past the boring tool, thus to cause the tool to bore an elliptical opening in the work piece, said first-named support including a turntable, in the form of a flat plate having a circular configuration, said stand including a flat, circular top plate, the turntable overlying the top plate, the turntable and top plate having cooperating index markings, for registration of selected markings in correspondingly selected positions of adjustment of the turntable relative to the top plate, said support including bearings providing the journal for said shaft, said support further including a frame through which the bearings extend, the boring device including a motor mounted upon the frame above the bearings, the motor having a driving connection with said shaft, said driving connection being of the change speed type, and including belt and pulley means driven by the motor.

9. A device for boring elliptical openings comprising a stationary stand, a support rotatably mounted thereon for adjustment about a first axis, a shaft journaled on said support for rotation about a second axis perpendicularly intersecting the first axis, a boring tool holder having a rigid connection to said shaft, a boring tool including a tip radially spaced from the second axis to travel in a circular path about the second axis in a plane perpendicular to the second axis, and a work piece support means mounted for adjustment in a straight path obliquely intersecting the second axis whereby a work piece may be moved along said path past the boring tool, thus to cause the tool to bore an elliptical opening in the work piece, said first-named support including a turntable, in the form of a flat plate having a circular configuration, said stand including a flat, circular top plate, the turntable overlying the top plate, the turntable and top plate having cooperating index markings, for registration of selected markings in correspondingly selected positions of adjustment of the turntable relative to the top plate, said support including bearings providing the journal for said shaft, said support further including a frame through which the bearings extend, the boring device including a motor mounted upon the frame above the bearings, the motor having a driving connection with said shaft, said driving connection being of the change speed type, and including belt and pulley means driven by the motor, said driving connection between the motor and shaft further including a worm gear driven by the belt and pulley means, and a driven gear connected to the shaft for rotation therewith in mesh with the worm gear.

10. A device for boring elliptical openings comprising a stationary stand, a support rotatably mounted thereon for adjustment about a first axis, a shaft journaled on said support for rotation about a second axis perpendicularly intersecting the first axis, a boring tool holder having a rigid connection to said shaft, a boring tool including a tip radially spaced from the second axis to travel in a circular path about the second axis in a plane perpendicular to the second axis, and a work piece support means mounted for adjustment in a straight path obliquely intersecting the second axis whereby a work piece may be moved along said path path the boring tool, thus to cause the tool to bore an elliptical opening in the work piece, said first-named support including a turntable, in the form of a flat plate having a circular configuration, said stand including a flat, circular top plate, the turntable overlying the top plate, said shaft projecting radially outwardly beyond the periphery of the turntable.

11. A device for boring elliptical openings comprising a stationary stand, a support rotatably mounted thereon for adjustment about a first axis, a shaft journaled on said support for rotation about a second axis perpendicularly intersecting the first axis, a boring tool holder having a rigid connection to said shaft, a boring tool including a tip radially spaced from the second axis to travel in a circular path about the second axis in a plane perpendicular to the second axis, and a work piece support means mounted for adjustment in a straight path obliquely intersecting the second axis whereby a work piece may be moved along said path past the boring tool, thus to cause the tool to bore an elliptical opening in the work piece, said first-named support including a turntable, in the form of a flat plate having a circular configuration, said stand including a flat, circular top plate, the turntable overlying the top plate, said shaft projecting radially outwardly beyond the periphery of the turntable, the shaft including an enlarged head at the end thereof remote from the turntable, soid holder being secured to the marginal portion of the head.

12. A device for boring elliptical openings comprising a stationary stand, a support rotatably mounted thereon for adjustment about a first axis, a shaft journaled on said support for rotation about a second axis perpendicularly intersecting the first axis, a boring tool holder having a rigid connection to shaft, a boring tool including a tip radially spaced from the second axis to travel in a circular path about the second axis in a plane perpendicular to the second axis, and a work piece support means mounted for adjustment in a straight path obliquely intersecting the second axis whereby a work piece may be moved along said path past the boring tool, thus to cause the tool to bore an elliptical opening in the work piece, said first-named support including a turntable, in the form of a flat plate having a circular configuration, said stand including a flat, circular top plate, the turntable overlying the top plate, said shaft projecting radially outwardly beyond the periphery of the turntable, the shaft including an enlarged head at the end thereof remote from the turntable, said holder being secured to the marginal portion of the head, said boring tool being removably, fixedly engaged in the holder and being adjustable within the holder in a direction radially of the shaft.

References Cited in the file of this patent

UNITED STATES PATENTS 1,893,810     Travis     Jan. 10, 1933